(12) United States Patent
Bayat et al.

(10) Patent No.: US 8,556,106 B1
(45) Date of Patent: Oct. 15, 2013

(54) REMOVABLE WATERTIGHT END CAP FOR OVAL HOUSING

(75) Inventors: Bijan Bayat, Plano, TX (US); Gordon L. Treichler, Wylie, TX (US)

(73) Assignee: Bayco Products, Inc., Wylie, TX (US)

( * ) Notice: Subject to any disclaimer, the term of this patent is extended or adjusted under 35 U.S.C. 154(b) by 0 days.

(21) Appl. No.: 13/534,616

(22) Filed: Jun. 27, 2012

(51) Int. Cl.
  *B65D 41/36* (2006.01)
  *B65D 51/18* (2006.01)
  *B65D 43/18* (2006.01)

(52) U.S. Cl.
  USPC .............. 220/294; 220/254.8; 220/259.3; 220/259.4; 220/288; 220/296; 220/327; 220/328

(58) Field of Classification Search
  USPC ........ 220/294, 254.8, 259.3, 259.4, 288, 327, 220/328, 296; 215/273; 401/68
  See application file for complete search history.

(56) References Cited

U.S. PATENT DOCUMENTS

| | | | |
|---|---|---|---|
| 1,392,587 A | 10/1921 | Low | |
| 1,422,278 A | 7/1922 | Low | |
| 1,431,911 A * | 10/1922 | Waller Jones | 220/288 |
| 1,675,395 A | 7/1928 | Whisler | |
| 1,812,465 A | 6/1931 | Blackmore | |
| 2,001,458 A * | 5/1935 | Dunn | 220/304 |
| 2,916,311 A | 12/1959 | Keplinger | |
| 3,121,508 A | 2/1964 | Kase | |
| 3,122,260 A | 2/1964 | Ryan | |
| 4,006,837 A * | 2/1977 | Gates et al. | 215/340 |
| 4,620,330 A | 11/1986 | Izzi, Sr. | |
| 4,871,077 A | 10/1989 | Ogden et al. | |
| 5,143,239 A * | 9/1992 | Yang | 220/254.9 |
| 5,505,041 A * | 4/1996 | Harlan | 53/473 |
| 5,850,934 A * | 12/1998 | Kumar | 220/582 |
| 6,899,246 B2 | 5/2005 | Gehring et al. | |
| 2011/0186585 A1* | 8/2011 | Lu | 220/575 |
| 2011/0198352 A1* | 8/2011 | Lown et al. | 220/254.8 |

* cited by examiner

*Primary Examiner* — Anthony Stashick
*Assistant Examiner* — Don M Anderson
(74) *Attorney, Agent, or Firm* — Whitaker Chalk Swindle & Schwartz PLLC; Stephen S. Mosher

(57) ABSTRACT

A reusable oval cap for an oval container that is threaded for ease of removal and installation and provides a water tight seal when fully seated in the container. When the cap is removed, the full cross sectional area of the housing is open for inserting or removing the contents of the container.

28 Claims, 5 Drawing Sheets

REMOVABLE WATERTIGHT END CAP FOR OVAL HOUSING

BACKGROUND OF THE INVENTION

1. Field of the Invention

The present invention generally relates to container closures and more specifically to a removable and reusable container closure, cap, or lid for containers having an oval or elliptical cross section shape that is also water tight. The invention is also adaptable to other non-circular containers or housings.

2. Background of the Invention and Description of the Prior Art

Containers or housings having a circular cross section present little difficulty in providing a reusable cap or closure because the latter may also be round, which enables the use of screw threads to secure the cap. While making such closures water tight imposes an additional requirement on the design, the use of gaskets or other features are readily adapted for round containers and reusable closures thereof. In contrast, non-circular containers or housings for an article, e.g., having an oval or elliptical cross section, or, typically, a rectangular cross section, present problems for a designer, particularly if the access to the interior of the container or housing must be water tight. Further, providing a water tight lid, cap, or closure for an oval-shaped container that is also reusable through many cycles presents additional challenges not yet solved by the known prior art.

Some known solutions include caps or containers that are fabricated of flexible materials so that the cap or the container is deformable, enabling it to conform to the shape of the container or the cap as it is rotated or deformed while removing or replacing the cap. However, such a cap may or may not be water tight, and the selection of materials is a trade off between deformability of the components, the integrity of the closure, and the longevity of the closure or seal. Another solution is to form an end panel extending inward from the sides of the container a sufficient distance to enable provision in the end panel for a circular cap or lid, including conventional threads. In other containers, structures such as opposed cams and locking arms, snap-fit closure mechanisms, and the like may be used for securing a cap or lid to the container or housing.

Another known device—an oval deodorant container—uses the principle of a screw jack to gradually expel a solid bar of the deodorant from within a round or oval container. A fixed, round knob attached to the lower end of a shaft having screw threads and rotating in a fixed bulkhead disposed at one end of the oval container causes a movable bulkhead or carrier disposed on the shaft having screw threads to traverse the inside of the container, thereby "jacking" or elevating the solid bar away from the opposite end of the housing to expose it for use.

It is known that a cap, lid, or closure for a round or circular container or housing that is threaded offers several advantages, namely reusability, ease of use, good tactile feedback of a tight closure, and the ability to provide a water tight seal when fully seated. However, while a bulkhead having a circular opening for a circular cap is one option, the disadvantage of this is that the size of the access opening must be limited to something less than the smallest diameter of the container or housing. This limitation is a serious disadvantage in housings or containers in which the entire internal cross section of the housing or container must be open for inserting or removing the contents of the housing. Further, if a container or housing is designed with a non-circular cross section, providing a water tight seal becomes a greater challenge, subject to increased complexity and expense. Even then, the integrity of such a seal can be seriously degraded if the container or housing becomes distorted.

There is thus a need for a solution to the problem of providing a reusable, water tight cap or lid for a container or housing that has a non-circular cross section.

SUMMARY OF THE INVENTION

Accordingly, the present invention provides a reusable oval cap assembly for an oval container that is threaded for ease of removal and installation and provides a water tight seal when fully seated in the container. When the cap assembly is removed, the full cross sectional area of the housing is open for inserting or removing the contents of the container.

It is an object of the invention to provide a reusable water tight cover for an oval container having major and minor axes intersecting a longitudinal centerline of the container comprising a movable transverse bulkhead having an oval outline congruent with and slightly smaller than the inner cross section of the oval container; and a threaded body rotating on an axle in a bushing in the bulkhead aligned substantially with the intersection of the major and minor axes, the threaded body having an external thread that matches a corresponding internal thread formed in the closest opposing inner surfaces of the oval container.

In other aspects of the invention the threaded body is configured for threadable engagement with the inner surfaces of the container near an open end thereof; the thread diameter (i.e., the outermost diameter) of the external and internal threads exceeds the minor inside diameter of the oval container by a predetermined dimension d; and the external and internal threads are multiple start threads.

In other aspects of the invention the transverse bulkhead further comprises first and second seals, one around the perimeter of the bulkhead and the other between the threaded body and the bulkhead; first and second wing extensions of the bulkhead to stabilize the threaded body; an axle, bushing, and retainer assembly to rotatably secure the bulkhead and threaded body together; a conductive contact plate to bridge the terminals of two battery cells enclosed within the oval container or housing; and a coin slot formed in the outer end of the threaded body to facilitate turning the threaded body into or out from a seated position within the container or housing.

In another aspect of the invention it is an object to provide a reusable water tight cover or cap for a container or housing having a non-circular cross section comprising a movable transverse bulkhead having an outline or perimeter congruent with and slightly smaller than the inner cross section of the non-circular container or housing; and a threaded body rotating on an axle in a bushing in the bulkhead aligned substantially with the intersection of the major and minor dimensional axes of the bulkhead, wherein the threaded body has an external screw thread that matches a corresponding internal screw thread formed in the closest opposing inner surfaces of the container or housing.

It is another object of the invention to provide a water tight container and cap assembly comprising a container having an oval cross section and internal threads formed in opposing inner surfaces thereof along a minor axis of the cross section and near an open end of the container; an oval bulkhead slidably received within the oval container and having a central bushing for receiving an axle therein; a cylindrical body having a longitudinal axis and fixed to an axle aligned therewith and extending from a first end of the cylindrical body, the axle rotatably secured in the bushing on a first side of the bulkhead and the cylindrical body having external threads there around that correspond to the internal threads formed in the container; a first O ring disposed around the perimeter of the bulkhead; and a second O ring disposed between the bulkhead and the cylindrical body and concentric with the bushing.

It is a further object of the invention to provide method for providing a water tight closure for an open end of an oval container having major and minor axes comprising the steps of forming an internal thread only on both inside opposing faces of said container aligned with the minor axis of the container; configuring a movable transverse bulkhead assembly with an oval outline congruent with the inner cross section of the oval container and with an axle bushing aligned normal to the plane of the bulkhead and with the longitudinal axis of the container; and including in the assembly a cylindrical body mounted on an axle and having an external thread that matches the internal thread, wherein the thread diameter of the external and internal threads exceeds the inside minor diameter of the container or housing.

DETAILED DESCRIPTION OF THE INVENTION

Figure 1:
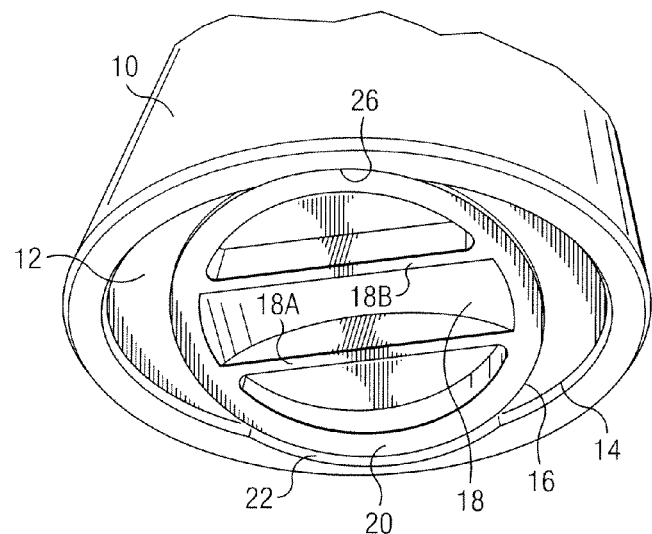
FIG. 1 illustrates a perspective view of one embodiment of a container or housing having an oval cross section and an oval end cap assembly according to the present invention.

For the purposes of the following description several terms are defined as follows. An Acme screw thread is a well-known type of screw thread having symmetrical crest and root (sometimes called apex and valley respectively) cross sections, further characterized by slopping sides that approach each other as they approach an crest from adjacent roots of the thread profile, or approach a root from the crest of two adjacent thread profiles. In the description that follows, the greater diameter of the threaded cylindrical body from crest to crest (i.e., apex to apex) is defined as $D_1$, also known as the nominal diameter. The lesser diameter from root to root is defined as $D_2$. The pitch diameter of the threaded body is thus $D_{PITCH} = (D_1 + D_2) \div 2$. These features facilitate machining or molding of the threads while providing a thread structure that is strong, wears well, and operates smoothly. Although Acme threads are preferred for the illustrated embodiments of the present invention, other types of screw threads may also be used.

Screw threads may be configured as single start threads whereby a single apex ridge encircles the cylindrical form of the threaded body, separated by the adjacent root portions. Screw threads may also be configured as multiple start threads whereby, for dual or "two-start" threads, two crest ridges begin 180° apart on one end of the body to be threaded and parallel with each other and separated by a root portion encircling the cylindrical body. Similarly, for triple or "three-start" threads, three crest ridges starting at radial positions 120° apart and parallel with each other, each crest separated from the next crest by a root, encircle the cylindrical body. One advantage of multiple start threads is that they permit one threaded body such as a cap to advance a greater distance along the threaded container with each rotation of the cap. This can be an advantageous feature in a cap structure that facilitates rapid operation with minimal effort—i.e., a minimum number of rotational motions—when installing or removing a threaded cap of a container.

The present invention exploits a property of screw threads that enables a round, threaded body to be secured within a hollow but non-circular body that is threaded only in the inside surfaces that are closest to each other. Thus, the internal threads formed in these inside surfaces extend for only part of the full circumference of the external threads of the round or cylindrical body that is to be threaded into the non-circular body. For example, it has been discovered that, in a container having an oval cross section, sufficient internal threads may be formed within an angle of approximately 60° of the circumference of the thread path on each side of the oval across the minor diameter of the oval. Thus, in this example, a total partial thread circumference of approximately 120° is sufficient provided there is enough material thickness to accommodate a full thread depth (crest-to-root) without weakening the side wall of the oval container for a relatively short thread run of 4 to 6 threads, i.e., 4 to 6 rotations for a single start thread. To exploit this property it is necessary that the cylindrical body have a diameter that is slightly larger than the dimension across the smallest diameter or width of the container or housing.

One of the principal components of the inventive end cap assembly is the bulkhead structure that is configured to move transversely within the container or housing along its longitudinal axis. This bulkhead, called a "movable transverse bulkhead," or, more simply, an oval bulkhead in this particular illustrated embodiment, is shaped to be essentially congruent with though slightly smaller than the inside cross section of the oval container within which it is caused to move by the mechanism of the end cap assembly described herein. The transverse bulkhead configured for use in containers or housings having other non-circular cross section shapes will of course by congruent with those other non-circular containers or housings.

A threaded cap assembly for an oval container for purposes of the following description, is described for one embodiment, a hollow, oval-shaped handle configured as a container or housing for a pair of round battery cells positioned side by side, but is not limited to such device. The invention is adaptable to similar non-circular container whereby access to the full cross sectional area of the container is required when an end cap is removed, and whereby an easily removable cap assembly reliable through many cycles of installation and removal is required. Other advantages and benefits will become apparent in the following detailed description read in conjunction with the included drawings. Further, the embodiment shown and described is provided to illustrate the principles of the present invention and not intended to limit the ways the invention may be implemented. Thus, the appended claims, which set forth the principles of the invention, its scope and features, are intended to cover not only the illustrated embodiment described herein but all other embodiments that are similar in structure and susceptible to employ the principles of the present invention as set forth in the claims.

In the accompanying drawings the various figures depict the invention and identify its features with reference numbers associated with the written description. The same reference numbers appearing in more than one figure refer to the same structural element or feature in the several figures.

By way of introduction the inventive apparatus provides a water tight end cap for an exemplary oval container or housing without requiring the use of deformable cap or body parts, or cammed or wedged structures. The end cap described herein is an assembly of an oval bulkhead and a cylindrical body. The cylindrical body has a nominal diameter $D_{NOM}$ (also denoted $D_1$ in FIGS. 4 and 7), which is necessarily slightly greater than the internal minor diameter $D_{H\ minor}$ of the oval housing. The amount of this difference is defined by dimension $d_{CR}=D1-D_{H\ minor}$ and is approximately or substantially equal to the distance in elevation between the crest and the root of the screw threads fixated on the cylindrical body and in the oval housing as will be described. This dimension $d_{CR}$ will be denoted simply as a predetermined dimension d in this Detailed Description and the appended Claims. The predetermined dimension $d=d_{CR}$ is the structural feature that allows the end cap assembly to be transported and retained into position within the container or housing, or transported and removed from the container or housing.

The cylindrical body of the end cap assembly is formed with external threads and is rotatably attached within the oval bulkhead. The oval bulkhead has the same shape—i.e., is congruent with—as the internal cross section of the oval housing. The major and minor diameters, $D_{MAJ}$ and $D_{MIN}$, of the end cap assembly are respectively slightly less than the corresponding major and minor internal diameters of the oval housing by a predetermined clearance so that the end cap assembly may traverse the space within the oval housing. This clearance, referred to as clearance C2 herein, should be a minimum value that takes into account the materials and the manufacturing tolerances of the oval housing and the end cap assembly and the need to avoid an interference fit between them. The external threads of the cylindrical body engage corresponding internal threads formed in the inside of the oval housing. These internal threads are formed on the opposing inner surfaces across the minor diameter of the oval housing, or, on the opposing surfaces across the narrowest width of a non-oval and non-circular housing or container. O-rings, one surrounding the perimeter of the bulkhead and the other disposed between the cylindrical body and the oval bulkhead provide a water tight seal between the end cap assembly and the container or housing. The cylindrical body rotates within the oval bulkhead on an axle or pivot shaft as the cylindrical body is drawn in to or out of the bulkhead.

In the example illustrated and described herein, an oval housing for a battery compartment that stores a plurality of round battery cells or a battery having a rectangular cross section is described. A conductive plate may be secured to the inside face of the cylindrical body to bridge the terminals of two battery cells disposed side-by-side within the oval housing or otherwise provide a conductive path to the circuit that includes the battery. To provide faster seating (or removal) of the oval end cap assembly the external threads on the cylindrical body and the internal threads on the inside, minor-diameter side walls of the oval housing may be a "two-start" multiple thread, or even a "three-start" multiple thread. To install the oval end cap assembly in the oval container or housing, the oval end cap assembly is inserted into the open end of the oval housing and the cylindrical body rotated to engage and follow the multiple start threads, thereby drawing the oval end cap into the oval housing to close the open end of the oval housing. The operation is the same one used to screw a circular, threaded cap on an open round bottle having a matching thread.

Many oval or rectangular containers provide a round opening and use a round cap with a multiple start thread to close the opening. However, the round opening necessarily has a smaller cross section than the cross section of the container. Examples include plastic beverage bottles. In some types of containers that cannot be round, this is a serious or at least inconvenient limitation. Thus the present invention provides a solution that permits a round-cap closure to be adapted to a non-round container or housing while permitting full cross section access to the interior of the non-round container or housing. The embodiment described herein includes features to provide a water tight seal between the end cap assembly and the container or housing.

While a housing having an oval cross section is illustrated in the present description, the principles of the present invention may be applied to containers or housings having a cross section shape that is non-circular, as long as the containers or housings have sufficient material thickness to accommodate the internal threads formed into the inside walls across the minor diameter of the cross section of the container or housing. Oval containers or housings are well-suited to use of the present invention because the curved shape of the longer sides enables a slightly longer path for these internal threads. As noted above, there must be approximately 100° to 140°, e.g., 120°, of a full circumference (360°) of the container or housing for the internal threads.

FIG. 1 illustrates a perspective view of one embodiment of a container or housing having an oval cross section and an oval end cap assembly installed therein according to the present invention. The illustrated embodiment is well suited for an oval housing for a hand-held appliance such as a flashlight, wherein the housing cross section is oval in shape to accommodate one or more pairs of round battery cells disposed side by side. In the figure, the end of an oval housing 10 is shown, with an end cap assembly 12 which, in this embodiment includes an oval bulkhead 14 and a cylindrical body 16. The cylindrical body 16 includes a recessed coin slot 18 to assist with rotating the cylindrical body 16 to install or remove the end cap assembly 12. In larger containers a coin slot may not be necessary and may be replaced by a single web across the inner diameter of the recessed end of the cylindrical body 16. In smaller containers the coin slot may be sized and formed for a flatted or Phillips head screwdriver. Also shown in FIG. 1 adjacent the rim 20 of the cylindrical body 16 and cut into the inner side of the housing 10 is a portion of a first relieved region 22. At the opposite side of the cylindrical body 16 adjacent the rim 20 of the cylindrical body 16 is a second portion of a relieved region 26 although it does not appear in the perspective of FIG. 1. The first and second relieved regions 22, 26 are disposed at the outer end of the locations of internal threads 30, 32 to be described in FIG. 2. These regions 22, 26 conform to the crest portion of the internal thread profile formed in the inner surfaces across the minor diameter of the oval container or housing.

Figure 2:
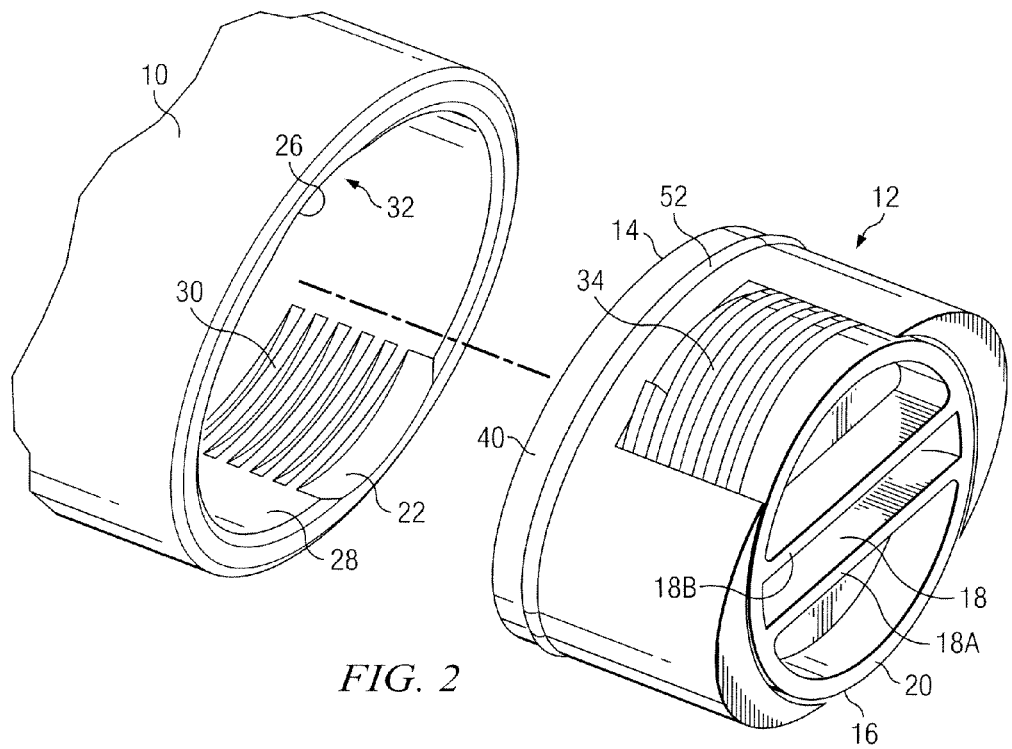
FIG. 2 illustrates a perspective view of the container or housing of the embodiment of FIG. 1 with the oval end cap assembly removed.

FIG. 2 illustrates a perspective view of the container or housing 10 of the embodiment of FIG. 1 with the oval end cap assembly 12 removed to expose the inside surface 28 of the housing 10 and to depict the assembled oval end cap assembly 12. Internal threads 30 are shown fainted into the visible inside surface 28 (also denoted as the inner wall 28) of the housing 10 for a nominal distance as shown. The internal threads 30 are of course circular but are fainted in only a portion of the inside surface 28 because the inside cross section of the housing 10 is not a circular bore but an oval shape in the illustrated embodiment having major $D_{H\ major}$ and minor $D_{H\ minor}$ diameters (See FIG. 4) that are generally normal both to each other and to a longitudinal axis $C_L$ of the housing 10. Another set of internal threads 32, though not visible in FIG. 2 are formed into the inside surface 28 of the housing 10 directly opposite the side that is visible. The first and second relieved regions 22, 26 are actually an extension of the crest portion of the profile of the internal threads 30, 32. As will be described in FIG. 3, a set of external threads that match these internal threads 30, 32 are disposed on the outside surface of the cylindrical body 16.

Figure 3:
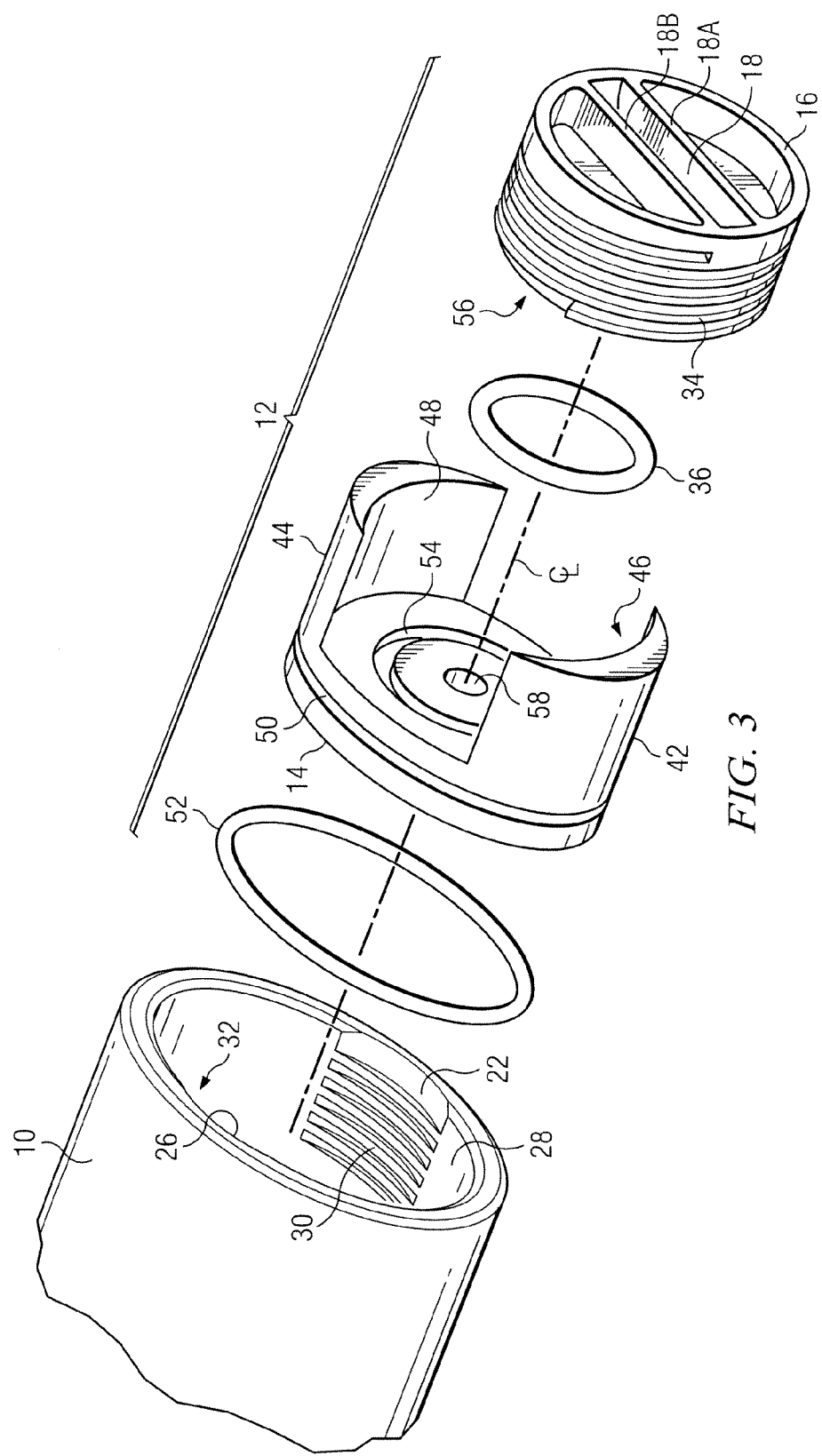
FIG. 3 illustrates an exploded perspective view of the container or housing of the embodiment of FIG. 1 showing the principle components of the oval end cap assembly.
Figure 4:
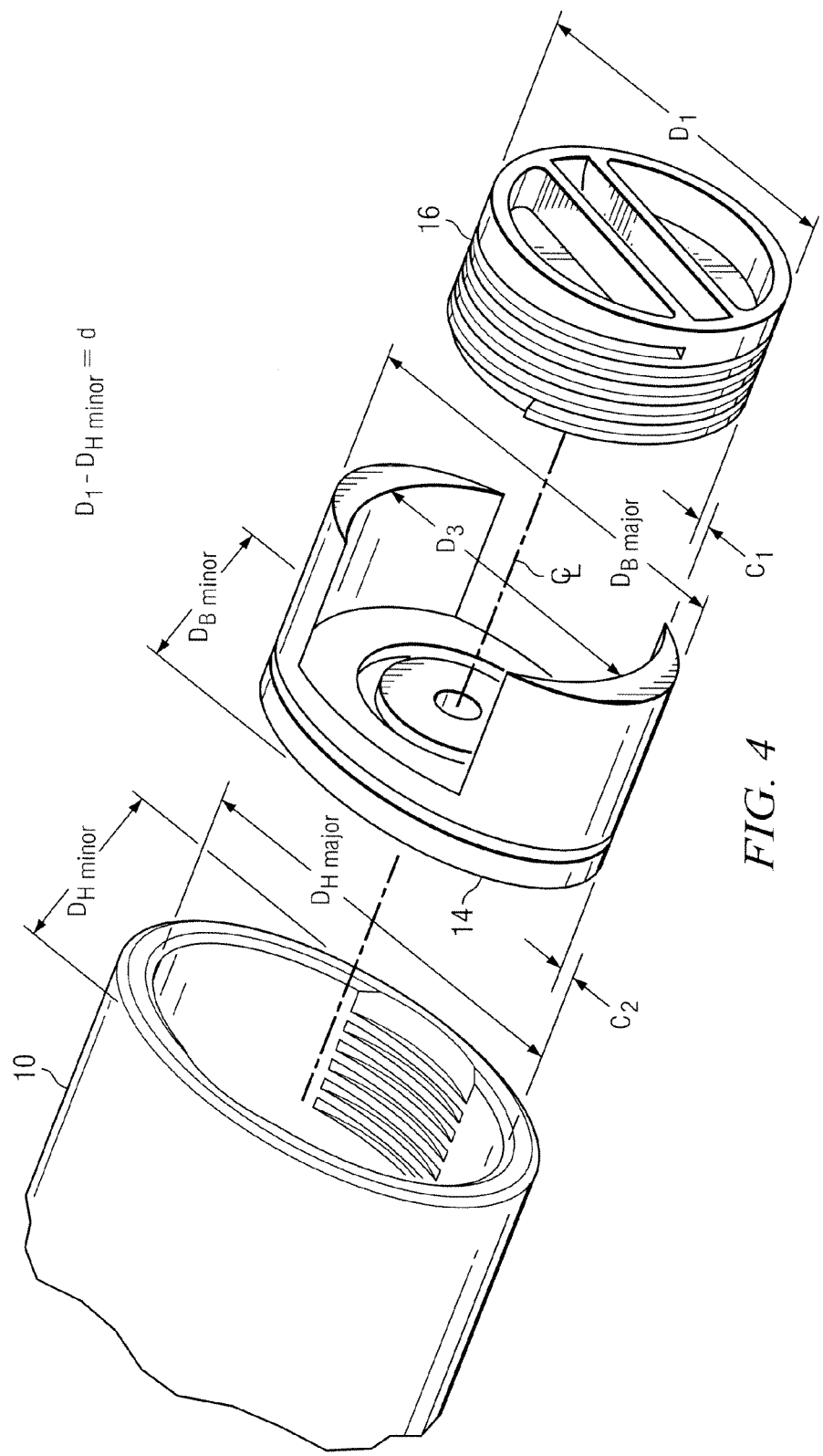
FIG. 4 illustrates the exploded view of FIG. 3 to identify selected dimensional features of the invention.

Continuing with FIG. 2, the assembled end cap assembly 12 is also shown. The cylindrical body 16 is shown assembled to the oval bulkhead 14 between first and second wings 42, 44 and seated against the inside of the base portion 40 of the oval bulkhead 14. The wings 42, 44 extend normal to the ends of the bulkhead 14 to provide additional stability to the end cap assembly 12 and support for the cylindrical body 14 during use of the end cap assembly 12. In some applications the wings 42, 44 may be eliminated as will be described in FIG. 6. The components of the oval end cap assembly are also shown in FIGS. 3 and 4 and will be fully described in FIG. 5. The end cap assembly 12 is shown with the external threads 34 on the cylindrical body 16 and a second O-ring 52 is shown seated in its corresponding groove 50 that is shown in FIGS. 3 and 5.

Figure 5:
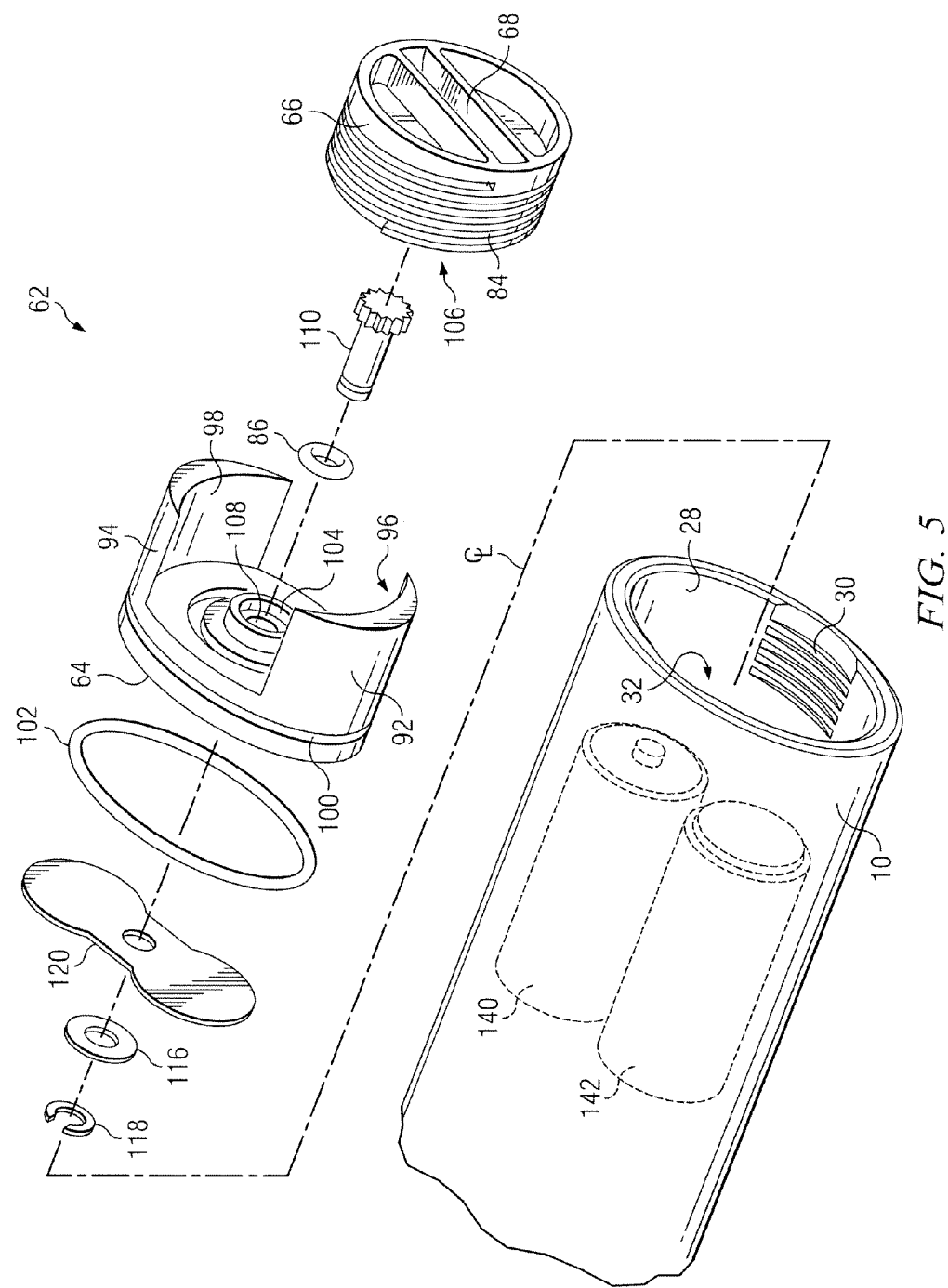
FIG. 5 illustrates an exploded perspective view of the embodiment of FIG. 1 showing all of the components of the oval end cap assembly.

FIGS. 3 and 5 described herein depict the same embodiment of the present invention that appears in FIG. 3 in abbreviated form to illustrate the principle components of the embodiment, while FIG. 5 shows the complete assembly. Accordingly, although the reference numbers used in the two figures are different, the same embodiment is described but in more detail. For example, the oval bulkhead 14 of FIG. 3 is the same component as the oval bulkhead 64 of FIG. 5. This is provided so that the written descriptions are more easily tracked. FIG. 3 illustrates an exploded perspective view of the container or housing 10 of the embodiment of FIG. 1 but abbreviated to show the principle components of the oval end cap assembly 12 arranged along the common longitudinal axis or centerline $C_L$ of the housing 10. The end cap assembly includes an oval bulkhead 14, a cylindrical body 16, a first O-ring 36 and a second O-ring 52. The cylindrical body 16 is shown with the webs 18A, 18B along both sides of the coin slot 18 and the external threads 34 encircling the cylindrical body 16. The oval bulkhead 14, which is disposed normal to the centerline $C_L$, includes first 42 and second 44 wings symmetrical about the centerline $C_L$ and extending from the ends of the oval bulkhead 14 (defined normal to the ends of the major diameter $D_{B\ major}$ of the oval-shaped, main portion of the bulkhead) in a direction facing away from the interior 28 of the oval housing 10. The outer surfaces of the wings 42, 44 coincide with the outer ends of the oval bulkhead 14. The respective inner surfaces 46, 48 of the wings 42, 44 define portions of a cylindrical space centered on the longitudinal axis $C_L$ of the housing 10 and partially enclosing cylindrical body 16.

Continuing with FIG. 3, the diameter between the inner 46, 48 surfaces of the wings 42, 44 is shown as diameter $D_C=D_1+C_1$, which is slightly greater than the diameter $D_1$ of the crest of the external threads 34 by a clearance amount $C_1$. $C_1$ is the clearance sufficient to permit free rotation of the cylindrical body 16 when assembled within the cylindrical space between the inner surfaces 46, 48 of the wings 42 and 44 of the oval bulkhead 14. Again, this clearance is best determined by consideration of the materials and manufacturing processes used in each particular application of the present invention. A first O-ring 36 is disposed in a circular groove 54 formed in the oval bulkhead 14 as shown to provide a water tight seal of the gap between a first inner-directed face 56 (not visible in FIG. 3) of the cylindrical body 16 and the oval bulkhead 14 when the cylindrical body 16 is fully inserted into the cylindrical space between the wings 42, 44. Alternatively, the first O-ring 36 could be disposed in a groove in the inner face 56 (not visible in FIG. 3) of the cylindrical body 16 or, as shown in another alternative embodiment in FIG. 7, the first O-ring 36 may be inserted into a relief 112 in the face 106 of the cylindrical body 66. Also shown in FIG. 3 is a second O-ring 52. The second O-ring 52 upon assembly fits into the groove 50 that surrounds the oval bulkhead 14 to seal the second clearance $C_2$ (See FIG. 4) between the perimeter of the oval bulkhead 14 and the inner wall 28 of the oval housing 10 when the end cap assembly 12 is installed into the housing 10. When assembled, the end cap assembly 12 appears as shown in FIG. 2. Several additional components of the end cap assembly 12, not shown in FIG. 3, which secure the components of the end cap assembly 12 together, are shown in FIG. 5. FIG. 5 also illustrates a slightly different alternate embodiment with respect to the first O-ring 86 and oval bulkhead 64.

FIG. 4, which is the same figure as FIG. 3, is provided to identify the location of several dimensions and clearances for reference. The major and minor inside dimensions of the oval housing 10 are shown as $D_{H\ major}$ and $D_{H\ minor}$ respectively. Similarly, the major and minor outer dimensions of the oval bulkhead 14 are shown as $D_{B\ major}$ and $D_{B\ minor}$ respectively. Further, the clearance between the outer surface 27 of the oval bulkhead 14 and the inner surface 28 of the oval housing 10 when they are assembled together will be understood to be uniform and is designated by $C_2$. Thus, the clearance between $D_{H\ major}$ and $D_{B\ major}$ (and between $D_{H\ minor}$ and $D_{B\ minor}$ but not indicated in the view of FIG. 4) is represented by $C_2$. The clearance between the inside diameter $D_3$ of the cylindrical space between the wings 42, 44 of the oval bulkhead in this embodiment and the diameter $D_1$ of the cylindrical body 14 is denoted by $C_1$. The clearance $C_2$ is set to a value that permits the oval bulkhead 14 to be drawn into the oval housing 10 but the clearance $C_2$ between them is sealed by the second O-ring 52 (See FIG. 3) upon installation. The clearance $C_1$ is set to a value that permits the cylindrical body 16 to rotate with minimal friction within the cylindrical space between the wings 42, 44 of the oval bulkhead 14.

Another structural dimension d is denoted by the symbol $d_{CR}$ in FIG. 4. It is defined by the relationship $d_{CR}=D1-D_{H\ minor}$ and is generally equal to $D_1-D_2$. See FIG. 7. By way of explanation, the end cap assembly is able to traverse into or out of the open end of the oval container or housing because the rotating part—the external threads of the cylindrical threaded body—engage the corresponding internal threads formed into the material of the inner surfaces of the container or housing that are disposed across the minor inside diameter of the oval container or housing. The cylindrical body carries the oval bulkhead with it as it is rotated within the bulkhead. The dimension d thus defines sufficient material to accommodate the internal threads for receiving the external threads.

FIG. 5 illustrates an exploded and more detailed perspective view of the embodiment of FIG. 1 showing all of the components of the oval end cap assembly 12, including an axle shaft, thrust washer, and a retaining ring to secure the principle components of the end cap assembly together. The end cap assembly 62 (analogous to the simplified end cap assembly 12 shown and described in FIG. 3) is assembled as follows: an axle shaft 110, oriented as shown and which may be embedded in alignment with the centerline $C_L$ of the cylindrical body 66 during molding, is used to rotatably secure the components of the end cap assembly 62 together. Axle shaft 110 includes a toothed head to prevent its rotation within the cylindrical body 66. A first O-ring 86 is installed over the axle shaft 110 that is inserted through the bushing 108 in the oval bulkhead 64. When the cylindrical body is fully seated within the oval bulkhead 64, the first O-ring 86 is fully seated within the recess 104 to provide a water tight seal between the oval bulkhead 64 and the cylindrical body 66. A second O-ring 102 may be seated within the groove 100 surrounding the perimeter of the oval bulkhead 64 to provide a water tight seal of the clearance $C_2$ between the outer surface of the end cap assembly 62 (represented by the outer surface 27 of the oval bulkhead 14 shown in FIG. 4) and the inside walls 28 of the oval housing 10. The axle shaft 110 may be secured to the oval bulkhead 64 using a thrust washer 117 and a C-shaped or E-shaped retaining ring 118 installed on the grooved end of the axle shaft 110. In applications wherein the oval housing 10 contains two battery cells 140, 142 shown disposed side-by-side in phantom in FIG. 5, a contact plate 120 may be included between the thrust washer 116 and the underside face (not shown in this perspective view) of the oval bulkhead 64. The contact plate may be provided to complete a connection between the battery cells 140, 142 in a circuit powered by the battery cells. Alternatively, the contact plate 120 may be used to provide other connections within the oval housing 10.

When assembled as described, the end cap assembly 62 may be inserted into the open end of the oval housing 10 and the cylindrical body 66 rotated CW (clockwise)—using a coin (not shown) inserted into the coin slot 68 if necessary—to engage the external threads 84 with the internal threads 30, 32. The rotation of the cylindrical body 66 within the oval bulkhead 64 draws the end cap assembly 62 into the interior 28 of the oval housing 10 until the end cap assembly 62 is fully installed. As installed the first 86 and second 102 O-rings on the end cap assembly 62 provide a water tight seal such that, if the oval housing is dropped into a body of water, water is kept from the interior of the oval housing 10. To open the oval housing 10 all that is required is to reverse the direction of rotation of the cylindrical body 66 to CCW, using a coin if necessary.

Figure 6:
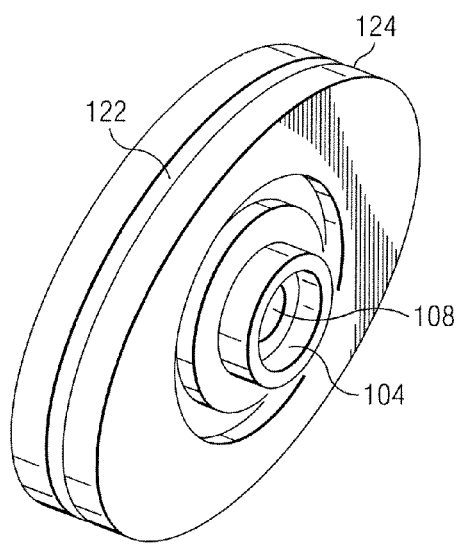
FIG. 6 illustrates a perspective view of an alternative embodiment of an oval bulkhead component of the oval end cap assembly shown in FIG. 3, 4, or 5.

FIG. 6 illustrates a perspective view of an alternative embodiment of an oval bulkhead component of the oval end cap assembly 12 shown in FIG. 3 or 4 or oval end cap assembly 62 shown in FIG. 5. In some embodiments of the end cap assembly 12, 62 the wings 42, 44 may be eliminated without changing the basic concept of the invention. In FIG. 6, the oval bulkhead 124 resembles a flat, oval plate to serve as the bulkhead to be inserted into the open end of the corresponding oval housing. The bulkhead 124 includes a groove 122 for the second O-ring 102, an axle bushing 108 to receive an axle shaft there through, and a recess 104 to receive a first O-ring 86 therein that is disposed around the axle shaft.

Figure 7:
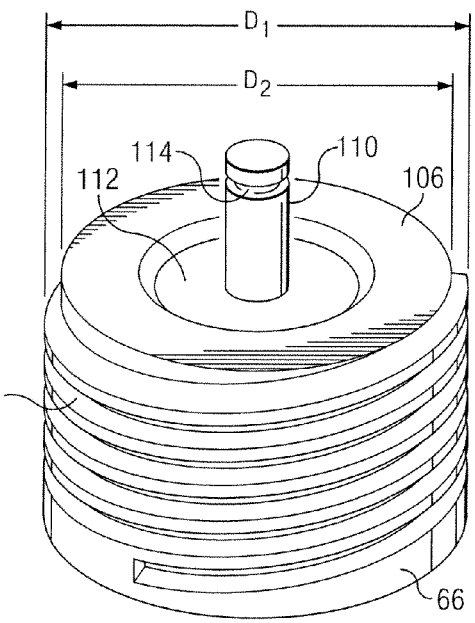
FIG. 7 illustrates an alternate embodiment of a cylindrical body of the oval end cap assembly of the present invention.

FIG. 7 illustrates an alternate perspective of the cylindrical body of the oval end cap assembly of FIG. 5. In this view, cylindrical body 66 is viewed looking toward the inner face 106 (or inner face 56 in FIG. 3) such that the axle shaft 110 and the recess 112 for the first O-ring 86 are visible, along with the interior face 106. As previously described, the axle shaft 110 may be embedded in the cylindrical body 66 during a molding process. Groove 114 is provided to receive a C-ring or an E-ring (See, e.g., FIG. 5) to secure the cylindrical body 66 to the oval bulkhead 64 along with the associated components as described. Also shown in FIG. 7 are the diameters D1 and D2 referred to earlier. D1 is the outer diameter of the cylindrical body 66 of FIG. 3 (or 16 of FIG. 3). D1 is also the "nominal diameter" of a cylindrical body having an Acme thread, and is the same diameter as the crest (peak) of the Acme thread. D2 is the diameter of the root (valley) of the Acme thread.

Figure 8:
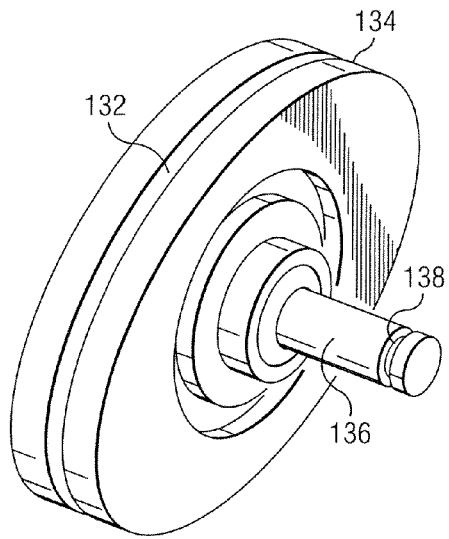
FIG. 8 illustrates an alternative embodiment of an oval bulkhead component of the oval end cap assembly of the present invention.

FIG. 8 illustrates a perspective view of an alternative to the oval bulkhead of the embodiment of FIGS. 1 through 5 according to the present invention. In this embodiment the axle shaft 136 is fixedly disposed in the embodiment of the oval bulkhead 134 depicted in FIG. 6. This embodiment, precludes the use of a coin slot provided in the cylindrical body used in the preferred embodiments, which would also preclude the use of the thrust washer and retaining ring assembly for retaining the cylindrical body within the oval bulkhead. Nevertheless, it represents another way to rotatably support the cylindrical body upon the oval bulkhead. A groove 138 is provided in the pivot shaft 136 to receive a retaining ring to secure the cylindrical body to its remaining structure of the end cap assembly when the coin slot feature is not used.

While the invention has been shown in only one of its forms, it is not thus limited but is susceptible to various changes and modifications without departing from the spirit thereof. For example, the illustrated oval housing and end cap assembly described herein is provided for a hand-held flashlight that employs several small cylindrical battery cells positioned side-by-side within the oval housing. The end cap provides a water tight seal in case the flashlight is dropped in a body of water yet provides full access to the open end of the oval housing to allow the battery cells to be easily inserted into position. Moreover, the end cap assembly is manufactured economically using molded or stamped parts.

However, the principles embodied in the present invention as claimed have broad applicability and are readily adapted to many other non-circular containers or housings requiring an end cap assembly that provides a water tight seal, is useable through many cycles of removal and installation, is economical to manufacture, and, for most uses, requires no tools other than a coin to ensure that the end cap assembly is fully seated within the container or housing. In regard to non-circular containers or housings in general, the external threads foamed in the cylindrical body are configured to match a set of internal threads formed in the mid-portion of each of the sides that are separated from each other by the smaller dimension of the container or housing. For example, for a four-sided housing or container the internal threads are disposed in the mid portions of the two sides facing each other across the smallest width dimension. In a triangular container or housing, the internal matching threads may be formed into in the mid-portion of all three of the inside walls of the housing.

The invention is adapted for containers, housings, and end cap assemblies manufactured of molded or die cast materials such as thermoplastics and metal alloys, etc. While the illustrated embodiment describes an end cap assembly for a container or housing having an oval or ellipsoid cross section, other cross section shapes are contemplated. Such shapes are suitable as long as one dimension across the inside dimensions of the container or housing is smaller than another inside dimension to permit the formation of the circular internal threads in the more closely-spaced opposing inside surfaces of the container or housing.

In other modifications, the seals may be provided elsewhere than the exact locations described, the axle shaft and bushing features configured differently as long as the cylindrical threaded body is allowed to rotate within or upon the bulkhead, and the structure used to retain the components of the end cap assembly in alignment along the axis of rotation, etc.

What is claimed is:

1. A reusable water tight cover for an oval container having major and minor axes intersecting a longitudinal centerline of said container, comprising:
    a movable transverse bulkhead having an oval outline congruent with and slightly smaller than the inner cross section of said oval container; and
    a threaded body rotating on an axle in a bushing in said bulkhead aligned substantially with the intersection of said major and minor axes, said threaded body having an external thread that matches a corresponding internal thread foil led in opposing inner surfaces across a minor diameter of said oval container.

2. The assembly of claim 1, wherein said threaded body is configured for threadable engagement with said inner surfaces of said container near an open end thereof.

3. The assembly of claim 1, wherein the thread diameter of said external and internal threads exceeds the inside minor diameter of said oval container by a predetermined dimension (d).

4. The assembly of claim 3, wherein dimension (d) is defined as approximately equal to the crest-to-root depth of the external or internal thread.

5. The assembly of claim 1, wherein said external and internal threads are a multiple start thread.

6. The assembly of claim 1, wherein said external and internal threads are a two-start Acme thread.

7. The assembly of claim 1, wherein said transverse bulkhead further comprises:
    a first seal disposed around the outer perimeter of said transverse bulkhead; and
    a second seal disposed between said threaded body and said transverse bulkhead.

8. The assembly of claim 7, wherein said transverse bulkhead further comprises:
    respective first and second seats in said transverse bulkhead for said first and second seals.

9. The assembly of claim 1, wherein said transverse bulkhead further comprises:
    first and second wings disposed on said bulkhead and extending normal from the plane thereof at each end of said bulkhead to enclose the proximate portion of said external threads of said threaded body.

10. The assembly of claim 1, wherein said threaded body further comprises:
    a cylindrical body having an axle shaft fixed therein along said axis and configured for assembly with said bulkhead within said bushing.

11. The assembly of claim 1, wherein said threaded body is attached to said transverse bulkhead using a thrust washer and an "E" ring installed in a circumferential groove in said axle, thereby forming a transverse bulkhead assembly.

12. The assembly of claim 11, wherein said transverse bulkhead assembly further comprises:
    a conductive plate extending across an innermost end of said bulkhead assembly.

13. The assembly of claim 1, wherein said threaded body further comprises:
    a coin slot formed in an outer end of said threaded body to facilitate rotating said threaded body within said transverse bulkhead.

14. The assembly of claim 1, wherein said threaded body further comprises:
    a finger grip formed in an outer end of said threaded body to facilitate rotating said threaded body within said transverse bulkhead.

15. The assembly of claim 1, wherein said oval container comprises:
    internal space proximate said open end configured for supporting first and second cylindrical battery cells disposed side-by-side therein.

16. The assembly of claim 1, comprising:
    said transverse bulkhead includes an axle shaft normal to the plane of the bulkhead and aligned along said centerline of said container; and
    said threaded body includes a bushing for being rotatably mounted on said axle shaft.

17. A water tight container and cap assembly, comprising:
    a container having an oval cross section and internal threads formed in opposing inner surfaces across a minor diameter of said cross section and near an open end of said container;
    an oval bulkhead slidably received within said oval container and having a central bushing for receiving an axle therein;
    a cylindrical body having a longitudinal axis and fixed to an axle aligned therewith and extending from a first end of said cylindrical body, said axle rotatably secured in said bushing on a first side of said bulkhead and said body having external threads there around that correspond to said internal threads formed in said container;
    a first O ring disposed around the perimeter of said bulkhead; and
    a second O ring disposed between said bulkhead and said cylindrical body and concentric with said bushing.

18. The assembly of claim 17, wherein the thread diameter of said internal and external threads exceeds the inside minor diameter of said oval container by a predetermined dimension (d).

19. The assembly of claim 18, wherein dimension (d) is defined as approximately equal to the crest-to-root depth of the external or internal thread.

20. The assembly of claim 17, wherein said internal and external threads are a multiple start thread.

21. The assembly of claim 17, wherein said axle is secured within said bushing with a retaining ring.

22. The assembly of claim 17, wherein said cylindrical body includes a coin slot formed in an outer end thereof.

23. A method for providing a water tight closure for an open end of an oval container having major and minor axes, comprising the steps of:
    forming an internal thread on opposing inner surfaces across a minor diameter of said container aligned with the minor axis of said container;
    configuring a movable transverse bulkhead assembly with an oval outline congruent with the inner cross section of said oval container and with an axle bushing aligned normal to the plane of the bulkhead and with the longitudinal axis of the container; and
    including in said assembly a cylindrical body mounted on an axle and having an external thread that matches said internal thread, wherein the thread diameter of said external and internal threads exceeds the inside minor diameter of said container.

24. The method of claim 23, further comprising the step of:
    providing first and second wings on said bulkhead extending normal from the plane thereof at each end of said bulkhead to enclose the proximate portion of said external threads of said cylindrical body.

25. The method of claim 23, further comprising the step of:
securing said axle within said bushing such that said cylindrical body may be rotated within said transverse bulkhead thereby enabling said transverse bulkhead assembly to be moved into or out of a closed relationship with said open end of said container.

26. The method of claim 23, further comprising the steps of:
providing a first seal disposed around the outer perimeter of said transverse bulkhead; and
providing a second seal disposed between said cylindrical body and said transverse bulkhead.

27. The method of claim 26, wherein the step of;
providing respective first and second seats in said transverse bulkhead for said first and second seals.

28. The method of claim 23, further comprising the step of:
providing a coin slot formed in an outer end of said cylindrical body to facilitate rotating said cylindrical body within said transverse bulkhead.

\* \* \* \* \*

UNITED STATES PATENT AND TRADEMARK OFFICE
CERTIFICATE OF CORRECTION

PATENT NO. : 8,556,106 B1  
APPLICATION NO. : 13/534616  
DATED : October 15, 2013  
INVENTOR(S) : Bijan Bayat et al.

Page 1 of 1

It is certified that error appears in the above-identified patent and that said Letters Patent is hereby corrected as shown below:

In the Claims

Column 11, line 16 should read:

"thread formed in opposing inner surfaces across a minor"

Signed and Sealed this  
Twenty-sixth Day of November, 2013

Margaret A. Focarino  
*Commissioner for Patents of the United States Patent and Trademark Office*